United States Patent [19]

Zupancic et al.

[11] Patent Number: 4,695,483
[45] Date of Patent: Sep. 22, 1987

[54] METHOD FOR THE PREPARATION OF COMPOSITE MEMBRANES BASED ON INTERPENETRATING POLYMER NETWORKS

[75] Inventors: Joseph J. Zupancic, Bensenville; Raymond J. Swedo, Mt. Prospect, both of Ill.

[73] Assignee: Allied Corporation, Morristown, N.J.

[21] Appl. No.: 887,777

[22] Filed: Jul. 21, 1986

Related U.S. Application Data

[63] Continuation-in-part of Ser. No. 670,187, Nov. 13, 1984, Pat. No. 4,613,440, which is a continuation-in-part of Ser. No. 485,971, Apr. 18, 1983, abandoned.

[51] Int. Cl.$^4$ .............................................. B05D 5/00
[52] U.S. Cl. .................................... 427/244; 427/377; 427/434.4
[58] Field of Search ..................... 427/244, 377, 434.4; 210/500.21, 500.28, 500.42

[56] References Cited

U.S. PATENT DOCUMENTS

| | | | |
|---|---|---|---|
| 3,526,588 | 9/1970 | Michaels et al. | 210/500.2 X |
| 3,661,634 | 5/1972 | Riley et al. | 210/500.2 X |
| 3,767,737 | 10/1973 | Lundstrom | 264/41 |
| 3,892,655 | 7/1975 | Hickson | 208/111 |
| 3,892,665 | 7/1975 | Steigelmann et al. | 210/500.2 X |
| 3,951,789 | 4/1976 | Lee et al. | 210/500.2 X |
| 4,005,012 | 1/1977 | Wrasidlo | 210/500.2 |
| 4,132,824 | 1/1979 | Kimura et al. | 428/220 |
| 4,220,535 | 9/1980 | Leonard | 210/456 X |
| 4,243,701 | 1/1981 | Riley et al. | 427/244 |
| 4,262,041 | 4/1981 | Eguchi et al. | 210/506 X |
| 4,272,378 | 6/1981 | Sano et al. | 210/500.2 |

Primary Examiner—Evan K. Lawrence
Attorney, Agent, or Firm—Thomas K. McBride; John F. Spears, Jr.; Raymond H. Nelson

[57] ABSTRACT

Semipermeable composite membranes which comprise an interpenetrating polymer network may be prepared by reacting polyethylene glycol with a toluene diisocyanate to form an isocyanate-capped polyether, thereafter admixing the isocyanate-capped polyether with a heterocyclic nitrogen-containing compound to form an interpenetrating polymer network membrane-forming composition, forming a film of the composition on a porous support backing material and curing the resultant composite in a hydrous atmosphere to generate an amine-capped polymer, and subsequently reacting a portion of the isocyanate groups present to form a substituted polyurea which will physically enter the heterocyclic nitrogen-containing compound in the membrane.

16 Claims, No Drawings

019
METHOD FOR THE PREPARATION OF COMPOSITE MEMBRANES BASED ON INTERPENETRATING POLYMER NETWORKS

CROSS-REFERENCE TO RELATED APPLICATIONS

This application is a continuation-in-part of our copending applicatin Ser. No. 670,187 filed Nov. 13, 1984, now U.S. Pat. No. 4,613,440, which was a continuation-in-part of copending application Ser. No. 485,971 filed Apr. 18, 1983 and now abandoned, all teachings of which are incorporated herein by reference thereto.

BACKGROUND OF THE INVENTION

The use of semipermeable membranes for the separation of gases or liquids in reverse osmosis or ultrafiltration processes is well known. For example, in a reverse osmosis process, high pressure saline water may be placed in contact with a semipermeable membrane which is permeable to water but relatively impermeable to salt. Concentrated brine and relatively pure water are separated thereby; the relatively pure water may then be utilized for personal use such as drinking, cooking, etc., while the brine may be discarded. In addition, membranes may also be utilized for the separation of various gases. The separation of a gas mixture utilizing a membrane is effected by passing a feed stream of the gas across the surface of the membrane. Inasmuch as the feed stream is at an elevated pressure relative to the effluent stream, a more permeable component of the mixture will pass through the membrane at a more rapid rate than will a less permeable component. Therefore, the permeate stream which passes through the membrane is enriched in the more permeable component while, conversely, the residue stream is enriched in the less permeable component of the feed.

This ability to separate gases from a mixture stream will find many applications in commercial uses. For example, gas separation systems may be used for oxygen enrichment of air, for improved combustion efficiencies and conservation of energy resources. Likewise, nitrogen enrichment of air may be applicable where inert atmospheres are required. Other applications for oxygen enriched gases may be improving selectivity and efficiency of chemical and metallurgical processes. Similarly, inert atmospheres such as may be provided for by this invention may also be utilized in chemical and metallurgical processes. Some other applications of gas separation would include helium recovery from natural gas, hydrogen enrichment in industrial process applications, and scrubbing of acid gases. Specific uses for oxygen enrichment of air would be breathing systems for submarines and other underwater stations, improved heart-lung machines, and other lung assist devices. Another specific application of a gas separation system would be an aircraft to provide oxygen enrichment for life-support systems and nitrogen enrichment for providing an inert atmosphere for fuel systems. In addition, gas separation systems may be used for environmental benefits, e.g., methane can be separated from carbon dioxide in waste gases for sewage treatment processes and oxygen enriched air can be produced to enhance sewage digestion.

Another use for which membranes may be employed is the separation of polysaccharides into useable constituents. For example, in many commercial enterprises sugar is utilized to a great extent for its sweetening properties. It is used in the sweetening of foods, for the manufacture of syrups and confectionary items, in preserves and jams as a chemical intermediate for detergents, emulsifying agents and other sucrose derivatives such as plasticizers, resins, glues, etc. The usual derivation of sugar is from cane sugar and sugar beets. It is obtained by crushing and extracting the sugar from the cane with water or extracting the sugar from the sugar beet with water followed by evaporation and purifying with lime, absorbent carbon and/or various liquids. The chief component of this type of sugar is sucrose, while other sugars may contain other polysaccharides such as dextrose and levulose (fructose). Other polysaccharides which possess sweetening properties include glucose, maltose, etc. The various polysaccharides possess varying degrees of sweetness, especially when in pure form and not contaminated by any reversion products.

One source of glucose which possesses a relatively high degree of sweetness and which, in turn, may be converted to fructose, the latter possessing an even greater degree of sweetness, is a starch. As is well known, starch is present in many naturally-occurring plants including corn, potatoes, rice, tapioca, wheat, etc. Heretofore, it has been known to treat starch with an enzyme such as amyloglucosidase to obtain glucose. However, the treatment heretofore provided entailed a relatively long residence time in order to obtain a glucose syrup which contained about 94% glucose. The relatively long residence time which has heretofore been required restricts the throughput of glucose and results in the appearance of reversion products which impart a bitter taste to the glucose, thus negating the sweetening property of the compound as well as requiring further treatment in order to remove the offending product. One such reversion product which imparts a bitter taste comprises isomaltose.

Many methods involving the use of an enzyme such as amyloglucosidase to convert starch into sugar have been tried. However, each of these methods has some disadvantages attached thereto. For example, when using a free enzyme, it is necessary to continuously replace the enzyme which is lost during the production of the desired saccharide. Likewise, when using an immobilized enzyme, the heretofore relatively long residence time has resulted in the appearance of unwanted side products.

One method of overcoming many of the disadvantages hereinbefore set forth is to contact the feedstock such as starch with an enzyme for a relatively short residence time and thereafter subjecting the partially hydrolyzed reaction mixture which is obtained from the conversion reaction to an ultrafiltration step wherein said reaction mixture is passed over a membrane whereby higher glucose syrup will pass through the membrane as a permeate while the retentate material containing unhydrolyzed oligosaccharides may be recycled for additional treatment.

As will hereinafter be shown in greater detail, by utilizing the membranes of the present invention, it is possible to obtain a high degree of saccharide separation, which results in the obtention of desired products at a relatively low operating cost.

Heretofore, membranes which may be used for reverse osmosis or ultrafiltration processes have been prepared using a wide variety of chemical compounds to obtain the desired membrane. For example, U.S. Pat. No. 3,892,655 discloses a membrane and a method for producing the membrane in which a thin polymer film is formed on the surface of a liquid, generally water, and is subsequently transferred to the surface of a porous supporting membrane. During the transfer of thin polymer film, the porous support is maintained in a wetted stage with the liquid. Another U.S. Patent, namely U.S. Pat. No. 3,526,588 discloses a macromolecular fractionation process and describes a porous ultrafiltration membrane which is selective on the basis of pore size. Likewise, U.S. Pat. No. 3,767,737 discloses a method for producing the casting of "ultra-thin" polymer membranes similar in nature to previously mentioned U.S. Pat. No. 3,892,655 in that the thin film of the membrane is formed on the surface of a liquid and transferred to the surface of a porous support membrane. However, the thin film poymer will thus inherently possess the same disadvantage which may be ascribed to the membrane formed by the latter patent in that the thin film of the finished membrane is weakly attached to the porous support and the membrane thus produced cannot withstand substantial back pressure when in operation.

As was previously mentioned, semipermeable membranes have been prepared from a variety of compounds by utilizing a polymer as the membrane-forming material. Examples of semipermeable membrane-forming polymers which have been used will include silicon-containing compounds such as dimethyl silicon, silicon-carbonate copolymers, fluorinated silicons, etc., polystyrene-polycarbonate, polyurethanes, styrenebutadiene copolymers, polyarylethers, epoxides, cellulose nitrate, ethyl cellulose, cellulose acetate mixed with cellulose esters, etc. The membrane resulting from the polymer is usually composited on a finely porous support membrane such as polysulfone, cellulose nitrate-cellulose acetate, etc., the composition being, if so desired, impregnated on a natural fabric such as canvas, cotton, linen, etc., or on a synthetic fabric such as Dacron, Nylon, Orlon, etc.

Examples of some semipermeable membranes which have been used in the past are those described in U.S. Pat. No. 4,005,012 which discloses a thin-film composite membrane comprising a cross-linked epiamine composited on a porous support such as polysulfone, the composition being impregnated on a backing material such as Dacron. U.S. Pat. No. 4,132,824 discloses an ultra-thin film of a polymer composite comprising a blend of a methylpentene polymer and an organopolysiloxane-polycarbonate interpolymer while U.S. Pat. No. 4,243,701 discloses a membrane comprising a dimethyl silicon composited on a cellulose nitrate-cellulose acetate support member.

In addition to the aforementioned patents, other U.S. patents also disclose membrane materials. For example, U.S. Pat. No. 4,262,041 discloses a process for preparing a composite amphoteric ion exchange membrane in which monomers having a primary to a quaternary ammonium radical such as vinylpyridine and monomeric units possessing alcohol or acid functions are cross-linked with a compound such as a diisocyanate by reaction of the isocyanate with the alcohol or acid group to obtain a cross-linked polymer. The use of compounds such as vinylpyridine in this patent is as a component of a copolymer, the other monomer component of said copolymer being a compound which is capable of receiving a cation exchange group to prepare the desired amphoteric copolymer. It is the intent of this patent to cross-link these copolymers in order to render them insoluble in the media in which they are to be used. As will hereinafter be shown in greater detail, the isocyanates which are present in our invention are not used for the same purpose as taught by this patent. In a similar manner, the heterocyclic nitrogen-containing compound which is used in our invention is not employed as one component of a charge-bearing, cross-linked copolymer, as taught by this patent.

U.S. Pat. No. 4,272,378 is drawn to a semipermeable membrane involving the use of polymers containing more than 40 mole percent of acrylonitrile, said acrylonitrile being copolymerized with other monomers. The result is a membrane which will possess characteristics and performances which are entirely different and apart from those which are possessed by the membranes of the present invention. U.S. Pat. No. 4,220,535 claims a multi-zoned hollow fiber permeator which may be obtained from any suitable synthetic or natural material suitable for fluid separation or as supports for materials which effect fluid separations. However, this patent does not disclose the interpenetrating polymer network which makes up the membrane of the present invention.

Another U.S. Patent, namely U.S. Pat. No. 3,951,789 discloses high diffusivity membranes which consist of physically admixed matrix materials with solutions of polyamideamines, said admixed solution being cast into membranes. In this patent, the matrix materials such as poly(phenyl ether) are intimately admixed with the polymers, this admixture being unlike the distinction from the membranes of the present invention which are hereinafter set forth in greater detail.

From a reading of the following specification and appended claims, it will be apparent that we have now discovered membranes which comprise an interpenetrating polymer network may be prepared by reacting an isocyanate-capped polyether and a heterocyclic nitrogen-containing compound, and compositing the resultant interpenetrating polymer network on a porous support backing material, said membranes possessing desirable characteristics when utilized in separation processes.

SUMMARY OF THE INVENTION

This invention relates to a process for preparing composite membranes based on an interpenetrating polymer network. More specifically, the invention is directed to a method for preparing these composite membranes which may be utilized in the separation of liquids or gases when employed in various separation processes such as reverse osmosis, ultrafiltration, gas separation, dialysis, etc. By employing the membranes of the present invention, it is possible to effect the separation process in an efficient manner due to the characteristics of the membranes which include controlled swelling, selectivity, and flux.

The composite membrane prepared according to the process of the present invention will be based on an interpenetrating polymer network. This membrane is, as its name suggests, a system comprised of more than one polymer. The multiple polymers which comprise the system are based in such a manner so that the polymer chains of the two components intermix or interpenetrate with one another to result in a system which generates a new polymer network. The two or more polymers which are involved in this interpenetrating polymer system do not react with one another, in contrast to various polymer membranes which are found in prior references, and thus form a chemical bond between themselves, but remain distinct entities. The polymers which comprise the system cannot be extracted from one another and will show no phase separation. The interpenetrating polymer network membrane which results from the process hereinafter set forth in greater detail will possess unique properties which are independent of the properties exhibited by the host polymer and the guest polymer and will not comprise an averaging of these properties.

It is therefore an object of this invention to provide a process for the production of semipermeable composite membranes which are utilized in a variety of separation processes.

A further object of this invention is found in a process for the production of a composite semipermeable interpenetrating membrane whereby the resultant product will comprise a unique membrane.

In one aspect an embodiment of this invention resides in a process for the production of a composite semipermeable interpenetrating polymer network membrane which comprises reacting a polyether with an isocyanate to form an isocyanate-capped polyether, admixing said isocyanate-capped polyether with a heterocyclic nitrogen-containing compound selected from the group consisting of polyvinylpyridine and mixtures of polyvinylpyridine and poly(N-vinylpyrrolidone) to form an interpenetrating polymer network membrane-forming composition, forming a flim of said composition on a porous support backing material, curing the resultant composite in a hydrous atmosphere at curing conditions for a time sufficient to generate an amine-capped polymer by hydrolysis of a portion of said isocyanate-capped polyether with said amine-capped polymer subsequently reacting with a portion of the isocyanate groups present in said composition to form a substituted polyurea which serves to physically entwine said heterocyclic nitrogen-containing compound in said composition and recovering the resultant composite semipermeable interpenetrating polymer membrane.

A specific embodiment of this invention is found in a process for the production of a composite semipermeable interpenetrating polymer network membrane which comprises reacting a block copolymer of ethylene glycol and propylene glycol with toluene diisocyanate to form an isocyanate-capped polyether, mixing said isocyanate-capped polyether with a heterocyclic nitrogen-containing compound comprising poly(4-vinylpyridine) to form an interpenetrating polymer network membrane-forming composition, forming a film of said composition on a porous support backing material comprising polysulfone, curing the resultant composite in a hydrous atmosphere which possesses a relative humidity in the range of from about 20% to about 100%, at a temperature in the range of from about ambient to about 100° C. for a period of time in the range of from about 5 minutes to about 48 hours to generate an amine-capped polymer by hydrolysis of a portion of the isocyanate-capped polyether, subsequently reacting with a portion of the isocyanate groups present in said composition to form a substituted polyurea which serves to physically entwine said poly(4-vinyl-pyridine) in said composition, and recovering the resultant composite semipermeable interpenetrating polymer network membrane.

Other objects and embodiments may be found in the following further detailed description of the invention.

DETAILED DESCRIPTION OF THE INVENTION

As hereinbefore set forth, the present invention is concerned with a process for the production of composite membranes which are based upon interpenetrating polymer networks. The membranes which may be used in a wide variety of separation processes comprising a semipermeable composite consisting of an interpenetrating polymer network or polymer blend, the two terms being used synonymously and interchangeably here in the specification and appended claims, of an isocyanate-capped polymer and a heterocyclic nitrogencontaining compound in which the polymer blend is composited on a porous support backing material. The interpenetrating polymer network which comprises the membrane prepared according to the process of the present invention is composed of two or more polymers, or copolymers. A feature which distinguishes interpenetrating networks from a similar polymer blend is the fact that at least one of the polymer components of the interpenetrating networks is cross-linked to itself or to like components, but not to the other polymers. This unique cross-linking which is inherent to an interpenetrating network system means that the polymers which comprise the components of the system are physically entangled or entwined, but are not bound to one another by chemical bonds.

When preparing an interpenetrating polymer network membrane, the two polymers, which may be designated as a host polymer and a guest polymer, are dissolved in a mutually compatible solvent, during which time the chains of polymers become entwined. The solution containing the entwined polymers is cast upon a porous support backing material which may itself comprise a polymer, and as the solvent is allowed to evaporate, the chains of the component polymers remain physically entwined. Inasmuch as this is only a physical interaction, it differs from prior polymeric membranes in that no chemical cross-linking or covalent bonding has taken place between the different types of polymer chains. After casting and evaporation of the solvent, the coated support is then subjected to a cross-linking curing action which occurs in a high humidity or hydrous atmosphere. When exposed to this type of atmosphere, a portion of the isocyanate-capped polymer which, in this system, comprises the guest polymer hydrolyzes to form an amine-capped polymer. This portion of amine-capped polymer will react with the remaining portion of the original isocyanate-capped polymer to form a cross-linked network which physically and permanently entwines or entangles the heterocyclic nitrogen-containing compound in the network. However, the heterocyclic nitrogen-containing compound which, in this system, comprises the host polymer is not chemically bonded or cross-linked either to itself or to the polyurea polymer resulting from the reaction of amine-capped polymer with isocyanate-capped polymer. Inasmuch as the heterocyclic nitrogen-containing compound is so entwined or entangled in the cross-linked polyurea polymer, it is no longer soluble and cannot be dissolved out of the interpenetrating network matrix. The isocyanate-capped polymer which comprises one component of the copolymer may be prepared by reacting a polyether such as polyethylene glycol, polypropylene glycol or block copolymers containing both ethylene glycol and propylene glycol with an isocyanate-containing compound.

The isocyanate-containing compound may comprise compounds such as toluene diisocyanate, methylenediphenylisocyanate, ethylene diphenylisocyanate, propylene diphenylisocyanate, etc. It is to be understood that the aforementioned polyethers and isocyanate compounds are only representative of the types of compounds which may be employed and that others may also be used in the present invention, although not necessarily with equivalent results.

The reaction of the polyether or block copolymer with the isocyanate-containing compound is usually effected at reaction conditions which include an elevated temperature in the range of from about 50° C. to about 100° C. and preferably at atmospheric pressure, although it is contemplated within the scope of this invention that, if so desired, superatmospheric pressures ranging from 2 to about 50 atmospheres may be employed. The average molecular weight of the isocyanate-capped polymer can be varied by utilizing varying molecular weight polyethers, block copolymers or capping agents. For example, one particular type of block copolymer of ethylene glycol and propylene glycol which may be employed comprises the polymer which contains about 20% ethylene glycol and about 80% propylene glycol, the block copolymer having a molecular weight of about 2750. However, it is to be understood that this is just one example of the type of block copolymer which may be employed and that other copolymers containing varied amounts of ethylene glycol and propylene glycol as well as varying molecular weights may also be employed. In the preferred embodiment of the invention, the reaction is effected under neat conditions, although if so desired, solvents such as chloroform, carbon tetrachloride, or any other organic solvent in which the compounds are soluble may also be employed.

The isocyanate-capped polymer which has been prepared according to the above paragraph may then be dissolved in an appropriate solvent such as, for example, nitromethane and thereafter heterocyclic nitrogen-containing compounds may be added to the solvent. Examples of heterocyclic nitrogen-containing compounds which, as hereinbefore set forth, constitute the host polymer of the membrane will include mixtures of the polyvinylpyridines and poly(N-vinylpyrrolidone). When utilizing a mixture of a vinylpyridine and poly(N-vinylpyrrolidone), it is contemplated that the ratio of vinylpyridine to poly(N-vinylpyrrolidone) be within a range of from about 1:2 to 4:1 weight percent of polyvinylpyridine to poly(N-vinylpyrrolidone) and preferably in a range of from about 1.1:1 to about 4:1.

The formation of the membrane-forming composite is preferably effected at operating conditions which include ambient temperature and atmospheric pressure. After thoroughly admixing the isocyanate-capped polymer and the heterocyclic nitrogen-containing compound until a homogeneous solution is effected, the composite membrane is then prepared by contacting a porous support member with the solution.

In the preferred embodiment of the invention, the isocyanate-capped polyether and the heterocyclic nitrogen-containing compounds are present in the admixture in a weight ratio in the range of from about 1:1 to about 8:1 isocyanate-capped polyether to heterocyclic nitrogen-containing compound although it is also contemplated within the scope of this invention that the two components may also be present in amounts which fall outside the aforesaid range.

The porous backing support member or material may comprise a polymer such as polysulfone, polyethylene, polypropylene, polyphenylether, cellulose nitrate, cellulose acetate, etc., the thickness of this porous support material being in a range of from about 0.01 to about 100.0 microns. It is also contemplated within the scope of this invention that, if so desired, the porous support member or material may be impregnated on a fabric which acts as a backing therefor, said backing member being either natural or synthetic in origin and either woven or nonwoven in configuration. Some specific examples of these backing members which may be employed will include natural fabrics such as canvas, cotton, linen, etc. or synthetic fabrics such as polyesters, either woven or nonwoven, Dacron, Nylon, Orlon, etc. The support member which is contacted with the solution may be either in a wet or dry state.

In one embodiment, the composite membranes may be prepared by continuously forming a thin layer of the interpenetrating polymer network of the isocyanate-capped polymer and heterocyclic nitrogen-containing components directly on the finely porous surface of the support material by continuously passing one surface of the support material through the casting solution which contains the polymer network components. The thickness of the film of the interpenetrating polymer network may be controlled by the concentration of the polymer network in the solution as well as by the rate of withdrawal of the support material from the solution. By utilizing this method of asymmetric membrane preparation, it is possible to achieve several additional degrees of freedom beyond that which is possible when preparing a membrane according to more conventional methods. Some examples of these advantages will include an independent selection of materials constituting the finely porous support material, and independent preparation of the thin film and the porous support material whereby it is possible to optimize each component for its specific function, a reproductive variation in control over the thickness of the semipermeable barrier which is required to obtain the theoretical maximum in performance control over the porosity and perfection of the semipermeable barrier which is necessary to attain the theoretical semipermeability of the material, and the formation of the film directly on the finely porous surface of the support whereby said film is integrally bonded to the support member, thus permitting the finished membrane to withstand any back pressure which may be encountered in normal operation.

As an illustration of this continuous method of forming the film on the finely porous support material, a finely porous support may be prepared by casting the support on a casting machine from a solution which contains the support material such as a polysulfone, cellulose acetate, etc. as well as solvents such as ketones, including acetone, methylethylketone, diethylketone, etc., alcohols including methyl alcohol, ethyl alcohol, n-propyl alcohol, etc. and surfactants to increase the wettability of the components of the solution. The solution, after blending the various components thereof, is filtered to remove any foreign material by passing through a filter medium under superatmospheric pressure usually afforded by the presence of nitrogen, and thereafter is degassed to remove any dissolved inert gas, such as nitrogen. The solution is fed onto the casting belt and spread on said belt at a desired thickness by means for controlling the thickness such as a casting knife. The freshly cast solution is carried on the belt into a gelation chamber which is maintained at a slightly elevated temperature in the range of from about 10° to about 40° C. After passage through this first gelation chamber wherein the surface pores, size and permeability of the membrane is controlled, the belt and support membrane are passed into a second gelation chamber in which the properties of the membrane are fixed. The temperature of the second gelation chamber is higher than that of the first gelation chamber in order to promote the removal of the solvents which may be present. After passing from the second gelation chamber, the membrane is removed from the casting belt and passed to storage. Alternatively, after passing from the second gelation chamber, the support member may be contacted with the hereinafter described casting solution while in a wet state.

The support member or material which, if so desired, may be backed by a fabric of a type hereinbefore set forth is then continuously passed through a casting solution containing the interpenetrating polymer network of the isocyanate-capped polymer and heterocyclic nitrogen-containing components, said polymer network being dissolved in the appropriate solvent. The particular organic solvent which is employed will comprise the type of solvent which will dissolve the semipermeable membrane-forming polymer network, but will not be of the type which will dissolve or solubilize the porous support material or member, thus it is apparent that the particular solvent which is employed will depend upon both the interpenetrating polymer network and the particular support member which is to be employed.

The polymer blend of the isocyanate-capped polymer and the heterocyclic nitrogen-containing components will be present in the casting solution in an amount in the range of from about 0.1 to about 5.0% by weight of said solution, the amount of polymer blend present in the solution being dependent upon the desired thickness of the semipermeable membrane to be prepared. The solution is placed in a container or apparatus which is provided with a roller extending into the solution but is not completely immersed therein. The porous support member is continuously passed into the solution containing the polymer blend in such a manner so that the support member travels under the roller, one side of said support member being in contact with the roller. Inasmuch as one side of the support member is in contact with the roller, only the other side of the support member is in contact with the solution. The feed of the support member through the solution and rate of withdrawal may range from about 0.1 to about 50.0 ft/min., said rate again being dependent upon the thickness of the film which is desired to coat the support member.

After continuously withdrawing the polymer blend coated support material from the solution, the resulting composite membrane is cured by exposure to a hydrous atmosphere by passage through a curing zone. The curing in said zone is effected at a temperature in the range of from about ambient (20°–25° C.) up to about 100° C. while maintaining the atmosphere in the curing zone at a relative humidity which will range from about 20% to about 100%. The curing of the membrane will be effected for a period of time which will range from about 5 minutes to about 48 hours in duration, the time of curing being dependent upon the various parameters such as temperature and humidity. In any instance, the time will be sufficient to generate a substituted amine thereby converting a portion of the isocyanate-capped polymer to an amine-capped polymer. As was hereinbefore set forth, the remaining portion of the isocyanate-capped polymer will react with the amine-capped polymer to form a cross-linked network, physically and permanently entwining the host polymer comprising the heterocyclic nitrogen-containing compound in said network.

One example of a process in which the membrane of the present invention may be employed comprises the separation of glucose or maltose from separation processes in which a liquid starch feedstock is treated with an immobilized enzyme. The partially hydrolyzed reaction mixture which results from this treatment is passed through a separation system employing an ultrafiltration step whereby the desired high glucose or high maltose content of the reaction mixture passes through the membrane while the unhydrolyzed oligosaccharides are retained for recycling back to the hydrolysis step of the process. Another example of a use of the membrane system of the present invention is in an ion-exchange separation.

The following examples are given for purposes of illustrating the preparation of the composite membranes of the present invention and to their use thereof in ultrafiltration processes. However, it is to be understood that these examples are merely illustrative in nature and that the present process is not necessarily limited thereto.

EXAMPLE I

A membrane of the present invention was prepared by dissolving 11.0 grams of toluene diisocyanate (20% 2,6-, 80% 2,4-) in 250 ml of chloroform in a one-liter round bottom flask equipped with an addition funnel and a magnetic stirrer. Following this, 27.5 grams of a block copolymer of ethylene glycol and propylene glycol having a molecular weight of 2750 and containing 20% of ethylene glycol dissolved in 250 ml of chloroform was added over a four hour period of time, while vigorously stirring the mixture. The stirred mixture was allowed to stand at ambient temperature for a period of 48 hours. The resulting mixture which had a slight yellow color was placed in a rotating evaporator to remove the chloroform solvent. The remaining traces of solvent and unreacted toluene diisocyanate were removed by vacuum.

Thereafter, 0.42 gram of the isocyanate-capped polymer was dissolved in 50 ml of nitromethane and 0.40 gram of poly(4-vinylpyridine) was added to the solution. The solution was thoroughly agitated until all of the polymer was dissolved.

A sheet of polysulfone which had been washed with ethanol and dried was affixed to a sheet of glass and a membrane was cast by applying the casting solution to the sheet of polysulfone. The solution was allowed to remain on the polysulfone sheet for a period of one minute, then drained off and allowed to dry in air. Following this, the membrane was placed in a humidity chamber for a period of 45 minutes at ambient temperature, and recovered.

A second polymer containing a greater amount of the isocyanate-capped polymer was prepared by dissolving 0.61 gram of the aforementioned polymer in 50 ml of nitromethane and adding 0.40 gram of poly(4-vinylpyridine) to the solution. The casting solution was agitated until all of the polymer had dissolved and thereafter was cast on a sheet of polysulfone in a manner similar to that hereinbefore set forth. After treatment in a similar manner, the membrane was recovered.

EXAMPLE II

In a manner similar to that set forth in Example I above, 25.0 grams of toluene diisocyanate (80% 2,4- 20% 2,6-) was dissolved in 250 ml of chloroform in a one-liter round bottom flask provided with an addition funnel and magnetic stirrer. To the above mixture was added 15.0 grams of poly(propylene glycol) having a molecular weight of 1000 dissolved in 250 ml of chloroform. The addition was accomplished drop-wise over a four-hour period of time with stirring, following which the mixture was allowed to stand for a period of 48 hours at ambient temperature. The mixture was then concentrated on a rotary evaporator to remove the chloroform solvent, and dried on a vacuum system.

EXAMPLE III

In this example, a 500 ml kettle reactor which was equipped with a mechanical stirrer, addition funnel, condenser, drying tube, thermometer, and nitrogen gas purge was dried under a nitrogen gas flow. Following this, 72.0 grams of toluene diisocyanate (80% 2,4-, 20% 2,6-) was charged to the reactor. The reactor was heated to a temperature of 55° C. with stirring and 85.0 grams of poly(ethylene glycol) having a molecular weight of 400 was added drop-wise over a one hour period while stirring and heating the mixture. The reaction mixture had an exotherm to 100° C. Following this, the reaction mixture was stirred with heat for a period of three hours while maintaining the temperature in a range of from about 65° C. to about 75° C. At the end of this time, the isocyanate-capped polymer, which was a slightly yellowed viscous oil, was recovered in a yield of 148.25 grams.

EXAMPLE IV

To illustrate the preparation of another type of membrane which was utilized in a comparison example involving the evaluation of glucose separation, a solution of poly(4vinylpyridine) was prepared by dissolving 0.8 gram of poly(4-vinylpyridine) in 100 ml of absolute ethanol. A sheet of polysulfone membrane which had been washed with absolute ethanol was affixed to a sheet of glass and the poly(4vinylpyridine) solution was applied to the polysulfone. The solution was allowed to remain on the surface of the polysulfone sheet for a period of one minute, then drained off and allowed to dry in an air atmosphere. Following this, the membrane was placed in a humidity chamber for a period of 45 minutes at room temperature.

EXAMPLE V

The glucose separation abilities of the membrane of the present invention and another membrane which contained only polyvinylpyridine were evaluated by washing a 43 mm diameter disc of the membrane with water, placing the membrane in an ultrafiltration cell and flushing the membrane with water at a pressure of 70 psi for 45 minutes prior to evaluation with the glucose solution. The feedstock which was used for these experiments contained 1.5% and 3.0% dissolved solids, respectively. The pH of the solutions was adjusted to 4.0 by the addition of acetic acid and an ultrafiltration process was initiated. The results of these tests are set forth in Table I below. In the Table, membranes A and B were that prepared according to Example I, and membrane C was that prepared according to Example IV.

TABLE 1

| | DP4+ | DP3 | DP2 | DP1 | Flux (mL/cm$^2$ min) |
|---|---|---|---|---|---|
| MEMBRANE A | | | | | |
| Glucose Feed | 19.4 | 0.2 | 3.2 | 77.2 | — |
| 1.5% Dissolved Solids | 5.4 | 0.3 | 3.8 | 91.5 | $1.81 \times 10^{-3}$ (90 psi) |
| 3.0% Dissolved Solids | 4.6 | 0.4 | 3.2 | 91.8 | $1.99 \times 10^{-3}$ (90 psi) |
| MEMBRANE B | | | | | |
| Glucose Feed | 19.9 | — | 2.7 | 77.2 | — |
| 1.5% Dissolved Solids | 9.9 | 0.2 | 2.8 | 87.1 | $1.95 \times 10^{-4}$ (90 psi) |
| 3.0% Dissolved Solids | 6.1 | 0.2 | 3.3 | 89.2 | $2.02 \times 10^{-4}$ (90 psi) |
| MEMBRANE C | | | | | |
| Glucose Feed | 19.4 | 0.3 | 3.0 | 77.3 | — |
| 1.5% Dissolved Solids | 18.7 | 0.3 | 3.1 | 77.9 | $2.41 \times 10^{-1}$ (50 psi) |
| Glucose Feed | 10.7 | 0.2 | 3.0 | 86.1 | — |
| 3.0% Dissolved Solids | 11.6 | — | 3.0 | 85.4 | $1.38 \times 10^{-1}$ (50 psi) |

It is therefore readily apparent from a comparison of the results set forth in Table 1 above that the membrane of the present invention, that is, an interpenetrating polymer network membrane prepared from an isocyanate-capped polymer and a polyvinylpyridine composited on a backing support membrane exhibits greater ability to separate glucose than does a membrane comprising a polyvinylpyridine per se composited on a backing support membrane.

EXAMPLE VI

To illustrate a membrane system containing a ternary interpenetrating polymer network, an isocyanate-capped polymer was prepared by following the procedure set forth in Example III above. The isocyanate-capped polyethylene glycol polymer was then dissolved in nitromethane and a mixture of poly(4-vinylpyridine) and poly(N-vinylpyrrolidone) was added to the solution in varying amounts. After thorough addition until all of the polymer was dissolved, a sheet of polysulfone which was in the wet stage, no water having been removed from the preparation, was affixed to a sheet of glass and the casting solution was applied thereto. The solution was allowed to remain on the polysulfone sheet for a period of one minute, drained off, and allowed to dry in air. The membrane was then cured for a period of about 24 hours at a temperature of 50° C. in a humidity chamber which was set for a relative humidity of 88%.

The glucose separation ability of the membrane comprising the ternary system of interpenetrating polymer network cast on the polysulfone was evaluated by washing a 43 mm diameter disc of the membrane with water, placing the membrane in an ultrafiltration cell and flushing the membrane with water at a pressure of 70 psi for a period of 45 minutes prior to evaluation. The feedstock which was used for these experiments contained 30% dissolved solids and had a composition of saccharides comprising DP4+ of 18.3%, DP3 of 0.1%, DP2 of 2.9% and DP1 of 78.6%. The pH of the solution was adjusted to 4.0 by the addition of acetic acid, and an ultrafiltration process was initiated. The results of these tests are set forth in Table 2 below.

TABLE 2

| Membrane Composition Wt. % | | | Permeate Composition | | | | Flux × 10³ ml/(min. cm²) |
|---|---|---|---|---|---|---|---|
| TDI-PEO | P4VP | PVP | DP4+ | DP3 | DP2 | DP1 | 75 psi |
| 0.20 | 0.10 | 0.10 | 6.8 | 0.5 | 3.6 | 89.7 | 18.30 |
| 0.46 | 0.10 | 0.10 | 6.5 | 0.4 | 3.7 | 89.4 | 18.94 |
| 0.92 | 0.10 | 0.10 | 6.8 | 0.4 | 3.5 | 89.3 | 20.85 |
| 0.22 | 0.20 | 0.10 | 6.1 | 0.4 | 3.8 | 89.7 | 18.46 |
| 0.44 | 0.20 | 0.10 | 5.7 | 0.4 | 3.6 | 90.3 | 18.30 |
| 0.84 | 0.20 | 0.10 | 6.3 | 0.5 | 3.6 | 89.6 | 18.22 |
| 0.20 | 0.20 | 0.20 | 6.3 | 0.4 | 3.5 | 89.7 | 16.79 |
| 0.42 | 0.20 | 0.20 | 6.8 | 0.4 | 3.6 | 89.1 | 14.48 |
| 0.80 | 0.20 | 0.20 | 6.9 | 0.2 | 3.7 | 89.2 | 13.05 |
| 0.20 | 0.40 | 0.10 | 5.3 | 0.4 | 3.7 | 90.7 | 0.48 |

TDI-PEO - Isocyanate-capped poly(ethylene glycol) (molecular weight = 750)
P4VP - Poly(4-vinylpyridine)
PVP - Poly(N—vinylpyrrolidone)

EXAMPLE VII

To further illustrate a membrane system containing a ternary polymer network, an isocyanate-capped polymer was prepared according to the method set forth in Example II above. The isocyanate-capped poly(propylene glycol) was dissolved in nitromethane and a mixture of poly(4-vinylpyridine) and poly(N-vinylpyrrolidone) in varying amounts was added to the solution. As in Example VI above, after thorough stirring until the polymer was dissolved, a sheet of polysulfone in the wet stage was affixed to a pane of glass and the casting solution of the ternary interpenetrating polymer network was applied to the polysulfone sheet. The resulting membrane was cured for a period of 24 hours at a temperature of 50° C. in a humidity chamber which was maintained at a relative humidity of 88%

The membranes were tested to determine the glucose separation ability thereof in a means similar to that set forth in Example VI above. The feedstock was similar to that which was used in the above example comprising 18.3% DP4+, 0.1% of DP3, 2.9% of DP2 and 78.6% of DP1, the feedstock containing 30% dissolved solvents. The results of the test are set forth in Table 3 below.

TABLE 3

| Membrane Composition Wt. % | | | Permeate Composition | | | | Flux × 10³ ml/(min. cm²) |
|---|---|---|---|---|---|---|---|
| TDI-PPO | P4VP | PVP | DP4+ | DP3 | DP2 | DP1 | 75 psi |
| 0.38 | 0.10 | 0.00 | 3.80 | 0.50 | 3.5 | 92.2 | 3.98 |
| 0.20 | 0.10 | 0.00 | 4.05 | 0.46 | 3.5 | 92.0 | 5.29 |
| 0.20 | 0.10 | 0.00 | 3.70 | — | 3.8 | 92.4 | 2.12 |
| 0.76 | 0.10 | 0.00 | 3.80 | 0.30 | 3.6 | 92.3 | 0.20 |
| 0.20 | 0.10 | 0.10 | 4.8 | 0.1 | 2.9 | 92.1 | 9.79 |
| 0.40 | 0.10 | 0.10 | 5.8 | 0.2 | 3.1 | 90.9 | 13.13 |
| 0.90 | 0.10 | 0.10 | 6.3 | 0.3 | 3.3 | 90.1 | 13.05 |
| 0.24 | 0.20 | 0.20 | 5.2 | 0.1 | 2.8 | 91.8 | 4.67 |
| 0.42 | 0.20 | 0.20 | 5.1 | 0.3 | 3.5 | 91.0 | 8.99 |
| 0.80 | 0.20 | 0.20 | 6.1 | 0.4 | 3.6 | 89.9 | 8.75 |
| 0.26 | 0.20 | 0.10 | 5.6 | 0.4 | 3.6 | 90.4 | 10.74 |
| 0.40 | 0.20 | 0.10 | 7.3 | 0.4 | 3.4 | 90.2 | 20.69 |
| 0.84 | 0.20 | 0.10 | 6.7 | 0.4 | 3.5 | 89.4 | 1.96 |
| 0.20 | 0.20 | 0.40 | 6.3 | 0.4 | 2.9 | 90.4 | 5.94 |
| 0.40 | 0.20 | 0.40 | 6.3 | 0.5 | 3.2 | 90.0 | 16.55 |
| 0.82 | 0.20 | 0.40 | 7.1 | 0.4 | 3.5 | 89.0 | 11.94 |

TDI-PPO - Isocyanate-capped poly(propylene glycol) (molecular weight = 725)
P4VP - Poly(4-vinylpyridine)
PVP - Poly(N—vinylpyrrolidone)

EXAMPLE VIII

To illustrate the fact that knowledge of the separation capabilities of each of the host polymer and guest polymer cannot be used to predict the properties of the two polymers when composited on an interpenetrating network system, additional experiments or separations were performed. A membrane was prepared by admixing 0.10 grams of an isocyanate-capped polymer, prepared by reacting toluene diisocyanate with poly(propylene glycol), utilizing 1,4-diazabicyclo[2.2.2.]octane (triethylenediamine) as a catalyst for the polymerization of the polymer in 50 grams of a solvent comprising nitromethane. In addition, other amounts of the isocyanate-capped polymer were dissolved in this solvent so that three separate concentrations were obtained. Membrane A contained 0.20 wt. % of polymer; membrane B contained 0.44 wt. % of polymer and membrane C contained 0.80 wt. % of polymer. The polymers were cast on a sheet of polysulfone, the solution was allowed to remain on the sheet for a period of one minute, then drained off and allowed to dry in air. The membrane was then cured for a period of 24 hours at a temperature of 50° C., in a humidity chamber which was set for a relative humidity of 88%.

The glucose separation ability of the membranes was evaluated by washing a 43 mm diameter disc of the membrane with water, placing the membrane in an ultrafiltration cell and flushing the membrane with water at a pressure of 75 psi for 45 minutes prior to evaluation with the glucose solution. The feedstock which was used for these experiments contained 30% dissolved solids and had a composition of saccharides comprising DP4+of 18.3%, DP3 of 0.1%, DP2 of 2.9% and DP1 of 78.6%. The pH of the solution was adjusted to 4.0 by the addition of acetic acid and an ultrafiltration process similar to that hereinbefore described was initiated. The results of these tests are set forth in Table 4 below.

TABLE 4

| Membrane Composition (wt.) | | | | | Permeate Composition | | | | Flux × 10³ (mL/min. cm²) |
|---|---|---|---|---|---|---|---|---|---|
| TDI-PPO | P4VP | PVP | DABCO[a] | | DP4+ | DP3 | DP2 | DP1 | @ 75 psi |
| 0.20 | 0.00 | 0.00 | 0.02 | A | 8.31 | 0.11 | 2.9 | 88.7 | 15.92 |
| 0.44 | 0.00 | 0.00 | 0.10 | B | 7.0 | 0.10 | 3.4 | 89.4 | 16.63 |
| 0.80 | 0.00 | 0.00 | 0.10 | C | 5.0 | — | 2.7 | 91.9 | 13.37 |

[a]1,4-diazabicyclo[2.2.2] octane

It is to be noted that a low concentration of the polymer itself did not give as good results when compared to low concentrations of the isocyanate-capped polymer in admixture with the heterocyclic nitrogen-containing components such as poly(4-vinylpyridine) and poly(N-vinylpyrrolidone) as shown in Table 3 of the preceding example.

EXAMPLE IX

As a further illustration of the advantages found when employing an interpenetrating network membrane as compared to simple membranes for separation operations, a membrane comprising only poly(4-vinylpyridine) composited on polysulfone was utilized in an ultrafiltration process similar in nature to that hereinbefore set forth. The DP1 content of the permeate when using a flow rate of feed of 15.0 ml/46 min. at a pressure of 50 psi was only 87.4%. When using slightly higher rate of flow rate of 18.0 ml/39 min. at 50 psi, the DP1 content of the permeate was 86.2%.

A comparison of the results obtained when using a composite membrane comprising an interpenetrating polymer network consisting of an isocyanate-capped polymer and a heterocyclic nitrogen-containing compound which has been prepaped according to the method of the present invention discloses the fact that this type of membrane exhibits greater selectivity with regard to separation characteristics than do other membranes consisting only of an isocyanate-capped polymer or the heterocyclic nitrogen-containing compound.

We claim as our invention:

1. A process for the production of a composite semipermeable interpenetrating polymer network membrane which comprises reacting a polyether with an isocyanate to form an isocyanate-capped polyether, admixing said isocyanate-capped polyether with a heterocyclic nitrogen-containing compound selected from the group consisting of polyvinylpyridine and mixtures of polyvinylpyridine and poly(N-vinylpyrrolidone) to form an interpenetrating polymer network membrane-forming composition, forming a film of said composition on a porous support backing material, curing the resultant composite in a hydrous atmosphere at curing conditions for a time sufficient to generate an amine-capped polymer by hydrolysis of a portion of said isocyanate-capped polyether with said amine-capped polymer subsequently reacting with a portion of the isocyanate groups present in said composition to form a substituted polyurea which serves to physically entwine said heterocyclic nitrogen-containing compound in said composition, and recovering the resultant composite semipermeable interpenetrating polymer membrane.

2. The process as set forth in claim 1 in which said curing conditions include a temperature in the range of from about ambient to about 100° C. and a period of time in the range of from about 5 minutes to about 48 hours.

3. The process as set forth in claim 1 in which said hydrous atmosphere possesses a relative humidity in the range of from about 20% to about 100%.

4. The process as set forth in claim 1 in which said polyether is selected from the group consisting of polyethylene glycol, polypropylene glycol and block copolymers of ethylene glycol and propylene glycol.

5. The process as set forth in claim 1 in which said isocyanate is selected from the group consisting of toluene diisocyanate, methylene diphenylisocyanate, ethylene diphenylisocyanate, and propylene diphenylisocyanate.

6. The process as set forth in claim 1 in which said isocyanate-capped polyether and said heterocyclic nitrogen-containing compounds are present in a weight ratio in the range of from about 1:1 to about 8:1 isocyanate-capped polyether to heterocyclic nitrogen-containing compound.

7. The process as set forth in claim 1 in which the polyvinylpyridine and poly(N-vinylpyrrolidone) are present in said mixture in a weight ratio in the range of from about 1:2 to about 4:1 polyvinylpyridine to poly(N-vinylpyrrolidone).

8. The process as set forth in claim 1 in which said porous support backing material is polysulfone.

9. The process as set forth in claim 1 in which said porous support backing material is polyethylene.

10. The process as set forth in claim 1 in which said heterocyclic nitrogen-containing compound is poly(2-vinylpyridine).

11. The process as set forth in claim 1 in which said heterocyclic nitrogen-containing compound is poly(4-vinylpyridine).

12. The process as set forth in claim 1 in which said polyether is a block copolymer of ethylene glycol and propylene glycol, said isocyanate is toluene diisocyanate, said heterocyclic nitrogen-containing compound is poly(4-vinylpyridine) and said porous support backing material is polysulfone.

13. The process as set forth in claim 1 in which said polyether is polypropylene glycol, said isocyanate is methylene diphenylisocyanate, said heterocyclic nitrogen-containing compound is poly(2-vinylpyridine) and said porous support backing material is polysulfone.

14. The process as set forth in claim 1 in which said polyether is polyethylene glycol, said isocyanate is toluene diisocyanate, said heterocyclic nitrogen-containing compound is a mixture of poly(4-vinylpyridine) and poly(N-vinylpyrrolidone) and said porous support backing material is polysulfone.

15. The process as set forth in claim 1 in which said polyether is a block copolymer of ethylene glycol and propylene glycol, said isocyanate is ethylene diphenylisocyanate, said heterocyclic nitrogen-containing compound is a mixture of poly(2-vinylpyridine) and poly(N-vinylpyrrolidone) and said porous support backing material is polyethylene.

16. The process as set forth in claim 1 in which said polyether is polyethylene glycol, said isocyanate is propylene diphenylisocyanate, said heterocyclic nitrogen-containing compound is poly(4-vinylpyridine) and said porous support backing material is polyethylene.

* * * * *